(12) United States Patent
Liao et al.

(10) Patent No.: US 10,022,706 B1
(45) Date of Patent: Jul. 17, 2018

(54) COMPOSITE MATERIAL TYPE OXYGEN TRANSPORT MEMBRANE

(71) Applicants: Ming-Wei Liao, Taoyuan (TW); Tai-Nan Lin, Taoyuan (TW); Wei-Xin Kao, Taoyuan (TW); Chun-Yen Yeh, Taoyuan (TW); Hong-Yi Kuo, Taoyuan (TW); Yu-Ming Chen, Taoyuan (TW)

(72) Inventors: Ming-Wei Liao, Taoyuan (TW); Tai-Nan Lin, Taoyuan (TW); Wei-Xin Kao, Taoyuan (TW); Chun-Yen Yeh, Taoyuan (TW); Hong-Yi Kuo, Taoyuan (TW); Yu-Ming Chen, Taoyuan (TW)

(73) Assignee: Institute of Nuclear Energy Research Atomic Energy Council, Executive Yuan, Taoyuan (TW)

( * ) Notice: Subject to any disclaimer, the term of this patent is extended or adjusted under 35 U.S.C. 154(b) by 0 days.

(21) Appl. No.: 15/491,996

(22) Filed: Apr. 20, 2017

(51) Int. Cl.

| | | |
|---|---|---|
| *B01J 23/83* | (2006.01) |
| *C23C 16/44* | (2006.01) |
| *C23C 14/22* | (2006.01) |
| *B01D 53/22* | (2006.01) |
| *B01D 69/12* | (2006.01) |
| *B01D 71/02* | (2006.01) |
| *B01D 69/02* | (2006.01) |
| *B01J 23/78* | (2006.01) |
| *B01J 23/34* | (2006.01) |
| *B01J 23/18* | (2006.01) |
| *B01J 35/02* | (2006.01) |
| *B01J 37/00* | (2006.01) |
| *B01J 37/08* | (2006.01) |
| *B01J 37/02* | (2006.01) |
| *B01J 37/34* | (2006.01) |

(52) U.S. Cl.
CPC ............ *B01J 23/83* (2013.01); *B01D 53/228* (2013.01); *B01D 69/02* (2013.01); *B01D 69/12* (2013.01); *B01D 71/024* (2013.01); *B01J 23/18* (2013.01); *B01J 23/34* (2013.01); *B01J 23/78* (2013.01); *B01J 35/02* (2013.01); *B01J 37/0009* (2013.01); *B01J 37/0215* (2013.01); *B01J 37/08* (2013.01); *B01J 37/344* (2013.01); *C23C 14/22* (2013.01); *C23C 16/44* (2013.01); *B01D 2323/08* (2013.01); *B01D 2323/34* (2013.01); *B01D 2325/10* (2013.01); *B01D 2325/26* (2013.01)

(58) Field of Classification Search
CPC ........ B01J 23/83; B01D 53/228; B01D 69/02; C23C 14/22
USPC .................................. 502/303, 439
See application file for complete search history.

(56) References Cited

U.S. PATENT DOCUMENTS

2011/0180399 A1* 7/2011 Christie ............... B01D 53/228
204/295

* cited by examiner

*Primary Examiner* — Edward M Johnson

(57) ABSTRACT

A composite material type oxygen transport membrane and its preparation method are disclosed. The composite material that is an ionic-electronic mixed conducting material having high ionic conductivity is stirred into slurry and formed into a thin strip-shaped green tape substrate through tape casting to obtain a predetermined half-finished substrate, and then sintered to form the half-finished substrate into a conductive function type oxygen ion conducting substrate, followed by choosing small particle shaped highly catalyzed ionic-electronic mixed conducting material to be evenly adhered to at least one side surface of the conductive function type oxygen ion conducting substrate to form a reductive function type oxygen ion conducting layer. The reductive function type oxygen ion conducting layer and the conductive function type oxygen ion conducting substrate are then bonded to produce a composite material type oxygen transport membrane element.

6 Claims, 3 Drawing Sheets

COMPOSITE MATERIAL TYPE OXYGEN TRANSPORT MEMBRANE

BACKGROUND OF THE INVENTION

1. Field of the Invention

The present invention relates to a composite material type oxygen transport membrane and a method for producing the same, and more particularly to an oxygen transport membrane which can overcome the reduction of catalytic ability at a low temperature, significantly increases the overall oxygen transport flow rate, reduces the production cost and improves product yield.

2. Description of Related Art

Oxygen Transport Membrane (OTM) is a dense ceramic membrane that can transport oxygen ions, however, such ceramic materials have lattice defects resulting in that the oxygen ion may pass from the high concentration region through such dense ceramic film to the low concentration region when there is a concentration gradient of oxygen on both sides of the ceramic membrane at high temperature, And since only oxygen ions can pass through the ceramic membrane, thus, theoretically 100% oxygen purity is available with this feature. Oxygen transport membrane is usually made of dense ceramic material having a high temperature oxygen ion conductive function, and the material properties of the dense ceramic material operating at temperature above 600° C. has very high oxygen ion selectivity in blocking the other gas ions to pass through that leads to achieving effects of separating the pure oxygen from the oxygen mixture gas or air.

Oxygen transport membrane can be divided into pure ion conductor and ionic-electronic mixed conductor that include a pure ion conductor oxygen transport membrane with a mechanism in which the oxygen may obtain electrons and dissociate into oxygen ion, and the oxygen ion conductor reverted back into the oxygen through loss of the electron, and because the electron can't move in the pure ion conductor material, it is necessary to provide an external voltage and current to balance the reaction requirement for the electron transport inside the material, while in the ionic-electronic mixed conductor that composes of oxygen transport membrane, It does not need an external electric field to balance the reaction requirement for the electron transport inside the material. In comparison with the traditional cryogenic distillation method, it has the advantages of lower equipment cost and can be used in oxygen-enriched combustion to improve the combustion efficiency and reduce the pollution emissions.

The ionic conductivity of materials is the key factor for the efficiency of traditional oxygen transport membrane. In a known ionic-electronic mixed conducting material, barium strontium cobalt iron oxide ($Ba_{0.5}Sr_{0.5}Co_{0.8}Fe_{0.2}O_{3-\delta}$, BSCF) has a highest Ionic conductivity, leading to a high oxygen transport rate per unit area in theoretical value. On the other hand, reducing the thickness of the oxygen transport membrane can reduce the oxygen ion moving distance that enhances the overall oxygen transport efficiency, but is likely to cause inadequate overall strength of oxygen transport membrane, incurring damage in the subsequent assembly or heating process.

In the prior art, it used a multilayer structure oxygen transport membrane composed of a porous support substrate and a dense ceramic layer, and the multilayer structure oxygen transport membrane is supported by the thick porous support substrate to maintain strength and to reduce the thickness of the dense ceramic layer, reducing the oxygen ion moving distance. However, the internal fracture of the porous substrate will lead to a significant reduction in the fracture toughness of the material, and the complexity of the process and uncertain success rate of sintering may also cause the yield to decrease, and the mismatch in the coefficient of thermal expansion of the two layers will lead to components rupture in subsequent cooling process, affecting the separation of pure oxygen characteristics and product life. On the other hand, barium strontium cobalt iron oxide (BSCF) has high ionic conductivity, but its catalytic ability to oxygen is relatively low, resulting in that the surface reaction rate is less than oxygen ion transport speed at lower operating temperature that easily leads to drops in oxygen transport. Therefore, how to maintain the thickness of oxygen transport membrane and operate at relatively low temperature while further enhancing the oxygen transport capacity is still in urgent need to address the related issues.

China Patent 1655865 disclosed a membrane system structure comprising an oxygen transport membrane and a catalyst. The basic structure of which comprises a porous support substrate, a mixed conducting membrane and a catalytic material, and the mixed conducting membrane has a relative oxidation surface and the reduction surface, and can simultaneously conduct ions and electrons, and the catalytic material is an active metal, and the catalytic material can be selectively arranged on one surface side of the porous support substrate. However, it is difficult to avoid such structural strength flaw of the porous support substrate and deterioration problem of metal catalysts porous support substrate when put into actual operation with high temperature as mentioned above, also the combination effect of different metals is not acceptable.

To overcome the shortcomings, the present invention tends to provide a composite material type oxygen transport membrane to mitigate and obviate the aforementioned problems.

SUMMARY OF THE INVENTION

It is a primary object of the present invention to provide a composite material type oxygen transport membrane comprising a conductive function type oxygen ion conducting substrate with a high ionic conductivity feature and a reductive function type oxygen ion conducting layer with a high catalytic reaction capacity. The ion-electron mixed small particles of conducting material with high catalytic capacity are selected and uniformly dispersed and adhered to the surface of the conductive function type oxygen ion conducting substrate to form a reductive functional type oxygen ion conductive layer, thereby solving the problem of insufficient catalytic capacity of the conventional high ionic conductivity material in order to effectively improve the oxygen separation efficiency under low temperature conditions.

Another object of the present invention is to provide a method for producing a composite material type oxygen transport membrane by preparing a substrate green tape through tape casting and then sintering to form a conductive function type oxygen ion conducting substrate, and then the oxygen ion conducting layer is adhered to the surface of the substrate through a deposition process to complete the composite material type oxygen transport membrane, which aims to resolve the difficulty in sintering a multi-layer structure and improve effectively the yield of the product.

In order to achieve the object mentioned above, the technical features of the present invention includes a composite material type oxygen transport membrane comprising a conductive function type oxygen ion conducting substrate made in a sheet structure of ionic-electronic mixed conductor having a relatively high ionic conductivity characteristic and a reductive function type oxygen ion conducting layer composed of an ionic-electronic mixed conductor material having a relatively high catalytic capacity, and the reductive function type oxygen ion conducting layer is formed in a small particle uniformly dispersed and adhered to at least one surface of the conductive function type oxygen ion conducting substrate.

According to the above described structure, the mixed conductor material of the conductive function type oxygen ion conducting substrate is barium strontium cobalt iron oxide ($Ba_{0.5}Sr_{0.5}Co_{0.8}Fe_{0.2}O_{3-\delta}$, BSCF).

According to the above-described structure, the mixed conductor material of the reductive function type oxygen ion conducting layer is a mixed conductor material selected from the group consisting of lanthanum strontium cobalt iron oxide ($La_{0.6}Sr_{0.4}Co_{0.2}Fe_{0.8}O_{3-\delta}$, LSCF), barium iron zirconium oxide ($BaFe_{0.975}Zr_{0.025}O_{3-\delta}$, BFZ), Barium lanthanum iron oxide ($BaLa_{0.95}Fe_{0.05}O_{3-\delta}$, BLF), barium zirconium cobalt oxide ($BaZr0.2Co0.8FeO3-\delta$, BZCF), lanthanum strontium manganese oxide ($La_{0.8}Sr_{0.2}MnO_{3-\delta}$, LSM), lanthanum strontium cobalt oxide ($La_{0.8}Sr_{0.2}CoO_{3-\delta}$, LSC), samarium strontium cobalt oxide ($Sm_{0.5}Sr_{0.5}CoO_{3-\delta}$, SSC), sodium bismuth titanium oxide ($Na_{0.54}Bi_{0.46}TiO_{2.96}$, NBT).

The technical features adopted in the invention further include a composite material type oxygen transport membrane preparation method, comprising following steps: preparing a substrate green tape by tape casting and forming the substrate green tape into a preformed half-finished product, sintering the substrate green tape of the half-finished product at a temperature range from 1000 to 1200° C. for about 4 hours to form into a conductive function type oxygen ion conducting substrate, measuring the gas permeability of the conduction function type oxygen ion conducting substrate to confirm the predetermined gas separation efficiency, checking the dense property and microstructure of the conduction function type oxygen ion conducting substrate, if the gas permeability is maintained below $1.0 \times 10^{-5}$ Darcy, it is regarded as completely dense and sufficient gas separation efficiency, attaching an ionic-electronic mixed conductor material having small particles with high catalytic capacity to at least one surface of the oxygen ion conducting substrate to form a reductive function type oxygen ion conducting layer, in which the small particles with high catalytic capacity are adhered uniformly through a predetermined attaching procedure by bonding the reductive function type oxygen ion conducting layer and the conductive function type oxygen ion conducting substrate, forming a composite material type oxygen transport membrane element.

According to the mentioned above method, the step of preparing the substrate green tape includes laminating a plurality of substrate green sheets forming a substrate green tape. The overall thickness of substrate green tape is between 300 to 800 μm.

According to the mentioned above method, the sintering temperature is preferably about 1100° C., and the sintering temperature rate is preferably increased and/or decreased at 3° C./min.

According to the mentioned above method, the sintered dense property is determined by the gas permeability meter, and the microstructure is checked by a scan type electron microscope.

According to the method described above, the attachment procedure is selected from at least one of a laser melting sintering, physical vapor deposition, chemical vapor deposition, sol gel method, screen printing, high temperature sintering and the like.

According to the mentioned above method, the laser melting sintering method is a low power $CO_2$ laser with a wavelength of 10.6 μm and a maximum power of 50 W, which is focused by a focusing lens to 120 μm spot size on the surface of the conductive function type oxygen ion conducting substrate, and 8% power for the whole scan.

Other objects, advantages and novel features of the invention will become more apparent from the following detailed description when taken in conjunction with the accompanying drawings.

DETAILED DESCRIPTION OF THE PREFERRED EMBODIMENTS

Figure 1:
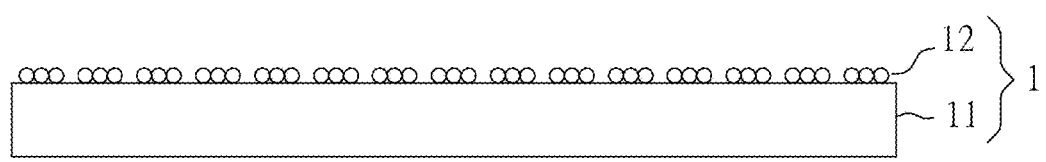
FIG. 1 is a plan view of a composite material type oxygen transport membrane according to the present invention.

Referring to FIG. 1, the main structure of the composite material type oxygen transport membrane 1 of the present invention comprises a conductive function type oxygen ion conducting substrate 11 and a reductive function type oxygen ion conducting layer 12, wherein the composite material type oxygen transport membrane 1 is made of ionic-electronic mixed conductors of sheet structure having a relatively high ionic conductivity characteristic. In a preferred embodiment, the mixed conductor material of the conductive function type oxygen ion conducting substrate 11 is barium strontium cobalt iron oxide ($Ba_{0.5}Sr_{0.5}Co_{0.8}Fe_{0.2}O_{3-\delta}$, BSCF).

The reductive function type oxygen ion conducting layer 12 is composed of an ionic-electronic mixed conductor material having a relatively high catalytic capacity, and the reductive function type oxygen ion conducting layer 12 is formed in a small particle uniformly dispersed and adhered to at least one surface of the conductive function type oxygen ion conducting substrate 11.

In a preferred embodiment, the mixed conductor material of the reductive function type oxygen ion conducting layer 12 is lanthanum strontium cobalt iron oxide ($La_{06}Sr_{0.4}Co_{0.2}Fe_{0.8}O_{3-\delta}$, LSCF) or selected from the group consisting of barium iron zirconium oxide ($BaFe_{0.975}Zr_{0.025}O_{3-\delta}$, BFZ), Barium lanthanum iron oxide ($BaLa_{0.95}Fe_{0.05}O_{3-\delta}$, BLF), barium zirconium cobalt oxide ($BaZr_{0.2}Co_{0.8}FeO_{3-\delta}$, BZCF), lanthanum strontium manganese oxide ($La_{0.8}Sr_{0.2}MnO_{3-\delta}$, LSM), lanthanum strontium cobalt oxide ($La_{0.8}Sr_{0.2}CoO_{3-\delta}$, LSC), samarium strontium cobalt oxide ($Sm_{0.5}Sr_{0.5}CoO_{3-\delta}$, SSC), sodium bismuth titanium oxide ($Na_{0.54}Bi_{0.46}TiO_{2.96}$, NBT).

Figure 2:
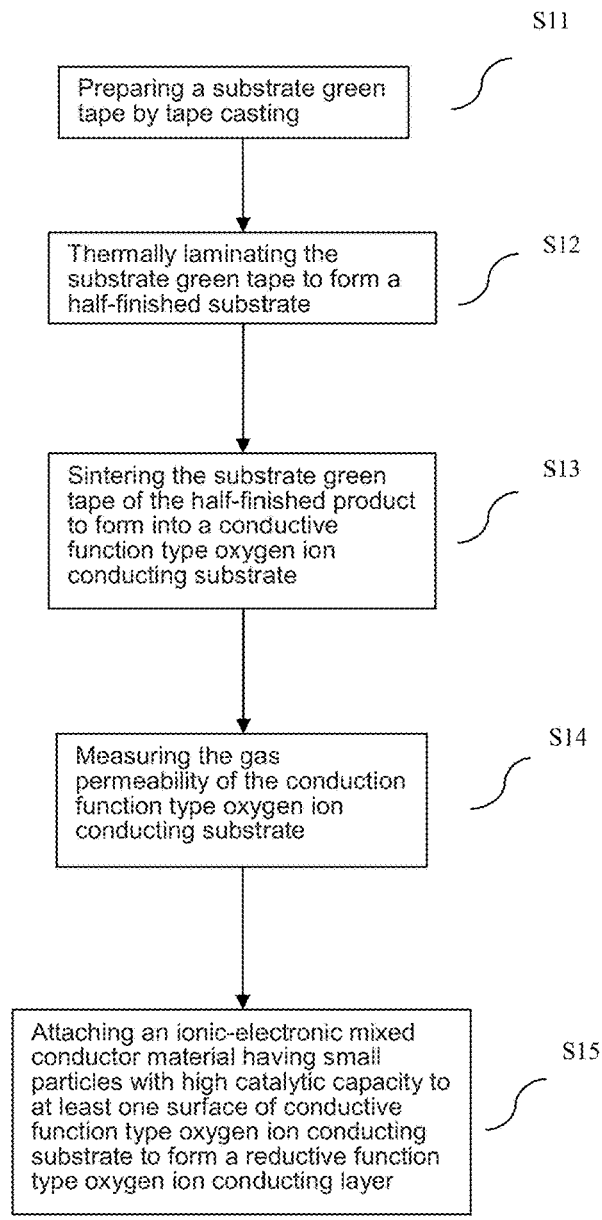
FIG. 2 is a flow chart of the main preparation method of the composite material type oxygen transport membrane of the present invention.

Referring to FIG. 2, the main preparation method of the composite material type oxygen transport membrane of the present invention comprises main steps, S11: forming the substrate green tape, S12 laminating a plurality of substrate green sheets forming a half-finished substrate; S13: sintering the substrate green tape of the half-finished product to form into a conductive function type oxygen ion conducting substrate: S14: measuring the gas permeability of the conduction function type oxygen ion conducting substrate to confirm the preset gas separation efficiency; S15: attaching an ionic-electronic mixed conductor material having small particles with high catalytic capacity to at least one surface of the oxygen ion conducting substrate to form a reductive function type oxygen ion conducting layer. Hereinafter, each step of the preparation method of the composite material type oxygen transport membrane of the present invention will be described in reference to the configuration of FIG. 1.

First, the step S11 is a step of selecting an ionic-electronic mixed conducting powder material having a high ionic conductivity property, and the powder is stirred and formed into a slurry-like thin strip-shaped substrate green tape by tape casting.

The step S12 is a step of thermally laminating and water pressure equalizing the thin strip-shaped substrate green tape to form a half-finished substrate with bulk thickness between 300 and 800 μm.

The step S13 is a step of sintering the substrate green tape of the half-finished product at a temperature range from 1000 to 1200° C., preferably 1100° C. with increased and/or decreased rate at 3° C./min, for about 4 hours to form into a conductive function type oxygen ion conducting substrate 11, The step S14 is a step of measuring the gas permeability of the conduction function type oxygen ion conducting substrate to confirm the preset gas separation efficiency, checking the dense property and microstructure of the conduction function type oxygen ion conducting substrate, in which the sintered dense property is determined by a gas permeability meter and the microstructure is checked by a scan type electron microscope.

The step S15 is a step of attaching an ionic-electronic mixed conductor material having small particles with high catalytic capacity to at least one surface of the oxygen ion conducting substrate 11 to form a reductive function type oxygen ion conducting layer 12, in which the small particles of high catalytic capacity are adhered uniformly through a predetermined attaching procedure and bonding the reductive function type oxygen ion conducting layer 12 and the conductive function type oxygen ion conducting substrate 11, forming a composite material type oxygen transport membrane 1.

In a preferable embodiment, the attachment procedure is selected from at least one of a laser melting sintering, physical vapor deposition, chemical vapor deposition, sol gel method, screen printing, high temperature sintering and the like.

The laser melting sintering method uses a low power $CO_2$ laser with a wavelength of 10.6 μm with a maximum power of 50 W, which is focused by a focusing lens to 120 μm spot size on the surface of the conductive function type oxygen ion conducting substrate 11, and the whole scan is carried out with 8% of the maximum power.

In a preferred embodiment, the attachment procedure can be performed using a laser melting sintering process with low power carbon dioxide lasers having a wavelength of 10.6 μm with a maximum power of 50 W to focus through a focusing lens 120 μm spot on the surface of the conductive function type oxygen ion conducting substrate 11 and using 8% power to scan over the small particle ionic-electronic mixed conducting biphasic material having high catalytic ability dispersed on the surface of the conductive function type oxygen ion conducting substrate 11, causing the change of the local temperature field on the surface of the small particle ionic-electronic mixed conductor material, leading to the biphasic material to be melted and sintered between the interfaces, and the ionic-electronic mixed conductor material is uniformly adhered to the surface of the conductive function type oxygen ion conducting substrate 11 and forms a reductive function type oxygen ion conducting layer 12.

Figure 3:
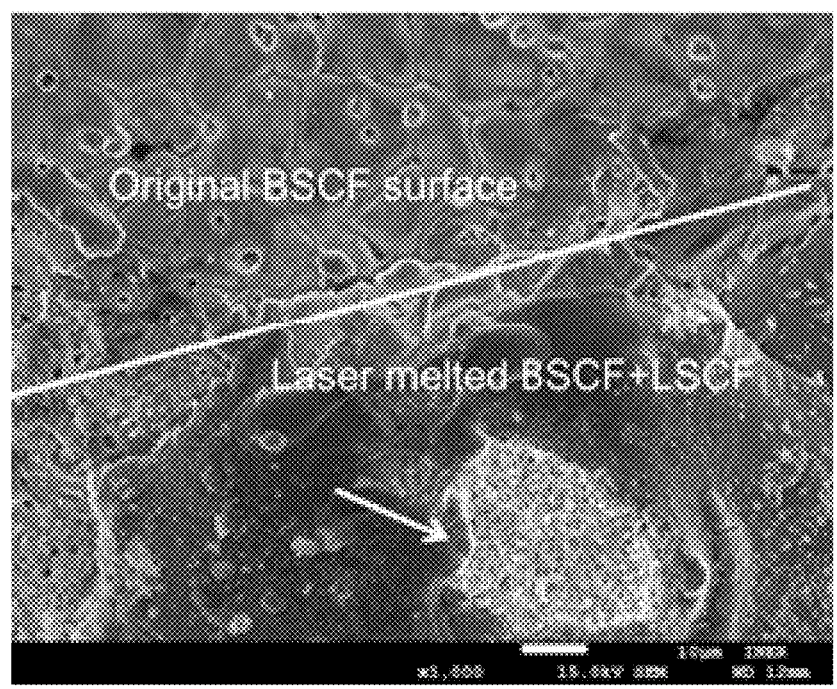
FIG. 3 is a view showing the surface microstructure of a composite type oxygen transport membrane prepared by a laser melting sintering method according to the present invention.

Referring to FIG. 3, the surface microstructure of the composite material type oxygen transport membrane 1 prepared by the laser melting sintering method was checked by an electron microscope, and it was found in the non-laser scanning region that the original conductive function type oxygen ion conducting substrate 11 (BSCF material) has no matter attached. On the contrary, the laser-scanned region of the conductive function type oxygen ion conducting substrate 11 exhibits ablating and gelled coating over the reductive function type oxygen ion conducting layer 12 (LSCF material), which was previously dispersed on the surface of the conductive function type oxygen ion conducting substrate 11, and a part of powder particles of the reductive function type oxygen ion conducting layer 12 with diameter 0.6-1.5 μm will be ablated by laser to form smaller particles, less than 0.5 μm, adhering to the surface of the oxygen ion conducting substrate 11 to further enhance the reaction area.

In addition, the laser melting and sintering method can avoid the thermal stress rupture caused by the difference of coefficient of thermal expansion between materials that arose in the conventional sintering process. Also the costly equipment or complicated procedures that are adopted in other kinds of attaching method are not required in the present invention, thus it can effectively reduce the equipment investment and production cost.

Figure 4:
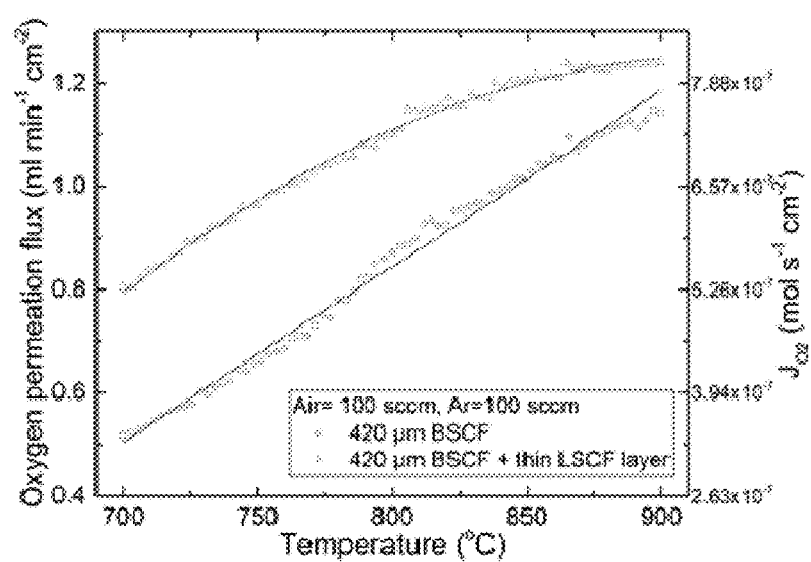
FIG. 4 is a graph comparing the oxygen transporting amount of the composite type oxygen transport membrane of the present invention with the conventional oxygen transport membrane.

Referring to FIG. 4, after the composite material type oxygen transport membrane 1 of the present invention is tightly packed, it is tested by feeding the air and argon of 100 sccm (standard cubic centimeters per minute), It was found that the oxygen transport flow rate of the composite material type oxygen transport membrane 1 had increased by more than 10% as compared with that of the conventional oxygen transport membrane at an operating temperature of 900° C., and more than 60% at an operating temperature of 700° C.

It can be seen, therefore, that the conductive function type oxygen ion conducting substrate 11 itself can provide a good catalytic ability at a relatively high temperature environment, so that the overall oxygen transport flow rate is less noticeable; however, at a relatively low temperature the surface of the conventional oxygen transport membrane dissociates and the oxygen ion velocity is greatly reduced, and due to the overall transport rate is limited by the number of oxygen ions, the overall transport is transferred to surface reaction control, and the reductive function type oxygen ion conducting layer 12 will help increase the dissociation of oxygen into oxygen ions and the number of surface oxygen ions arises more and increases the ion concentration difference at both ends, which can enhance the overall diffusion rate and oxygen transport flow.

In summary, the composite material type oxygen transport membrane of the present invention and the method for preparing the composite material type oxygen transport membrane can effectively reduce the catalytic capacity of the conventional high ionic conductivity material at a relatively low temperature and improve the overall oxygen transport flow rate and reduce the production cost.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for preparation of a composite material type oxygen transport membrane, comprising following steps:

preparing a substrate green tape by tape casting and forming the substrate green tape into a preformed half-finished product, sintering the substrate green tape of the half-finished product at a temperature range from 1000 to 1200° C. for about 4 hours to form into a conductive function type oxygen ion conducting substrate, measuring the gas permeability of the conduction function type oxygen ion conducting substrate to confirm the predetermined gas separation efficiency by checking the dense property and microstructure of the conduction function type oxygen ion conducting substrate, if the gas permeability is maintained below $1.0 \times 10^{-5}$ Darcy, the process proceeds to the next step, attaching an ionic-electronic mixed conductor material having small particles with high catalytic capacity to at least one surface of conductive function type oxygen ion conducting substrate to form a reductive function type oxygen ion conducting layer, in which the small particles of high catalytic capacity are adhered evenly through a predetermined attaching procedure by bonding the reductive function type oxygen ion conducting layer and the conductive function type oxygen ion conducting substrate, forming a composite material type oxygen transport membrane element.

2. The method for preparation of a composite material type oxygen transport membrane of claim 1, wherein the step of preparing the substrate green tape includes thermally laminating and water pressure equalizing the thin strip-shaped substrate green tape to form a half-finished substrate with bulk thickness between 300 and 800 μm.

3. The method for preparation of a composite material type oxygen transport membrane of claim 1, wherein the sintering temperature is preferably about 1100° C., and the sintering temperature rate is preferably increased and/or decreased at 3° C./min.

4. The method for preparation of a composite material type oxygen transport membrane of claim 1, wherein the sintered dense property is determined by the gas permeability meter, and the microstructure is checked by a scan type electron microscope.

5. The method for preparation of a composite material type oxygen transport membrane of claim 1, wherein the attachment procedure is selected from one of a laser melting sintering, a physical vapor deposition, a chemical vapor deposition, a sol gel method, a screen printing, and a high temperature sintering.

6. The method for preparation of a composite material type oxygen transport membrane of claim 5, wherein the laser melting sintering method is a low power $CO_2$ laser with a wavelength of 10.6 μm and a maximum power of 50 W, which is focused by a focusing lens to 120 μm spot size on the surface of the conductive function type oxygen ion conducting substrate, and 8% power for the whole scan.

* * * * *